United States Patent [19]

Armstrong

[11] Patent Number: 5,513,949
[45] Date of Patent: May 7, 1996

[54] CONTAINMENT STRUCTURE

[75] Inventor: Neil D. Armstrong, Derbyshire, England

[73] Assignee: Rolls-Royce plc, London, England

[21] Appl. No.: 280,991

[22] Filed: Jul. 27, 1994

[30] Foreign Application Priority Data

Sep. 15, 1993 [GB] United Kingdom .................. 9319114

[51] Int. Cl.$^6$ .............................. F01D 21/00; F01D 25/24
[52] U.S. Cl. .............................. 415/9; 415/200; 428/34.6; 428/34.7; 428/35.9
[58] Field of Search .......................... 415/9, 173.1, 173.3, 415/173.4, 173.6, 196, 197, 200; 428/34.6, 34.7, 35.8, 35.9, 34.1; 138/124, 127, 138, 140, 143

[56] References Cited

U.S. PATENT DOCUMENTS

| 3,269,422 | 8/1966 | Matthews et al. | 138/140 |
| 3,689,971 | 9/1972 | Davidson | 415/173.4 |
| 4,699,567 | 10/1987 | Stewart | 415/200 |
| 4,705,454 | 11/1987 | Bouiller et al. | 415/9 |
| 4,898,212 | 2/1990 | Searfoss et al. | 138/124 |

Primary Examiner—Edward K. Look
Assistant Examiner—Christopher Verdier
Attorney, Agent, or Firm—Cushman Darby & Cushman

[57] ABSTRACT

A ducted fan gas turbine engine is provided with a fan casing provided with a portion adapted to provide fan blade containment in the event of fan blade failure. The containment portion comprises three layers: a wall adjacent the fan blades, a plurality off metallic tubes attached to the radially outer surface of the wall and a layer of strong woven fibrous containment material surrounding the metallic tubes.

5 Claims, 1 Drawing Sheet

CONTAINMENT STRUCTURE

FIELD OF THE INVENTION

This invention relates to a containment structure and is particularly concerned with a containment structure which is suitable for use with a ducted fan gas turbine engine.

BACKGROUND OF THE INVENTION

Ducted fan gas turbine engines for aircraft conventionally comprise a large diameter propulsive fan which is mounted at the upstream end of the engine and is surrounded by an annular casing. During the operation of such engines, there is an extremely remote chance that a foreign body, such as a bird, could impact the fan and cause severe fan damage. That damage could result in part or all of a fan aerofoil blade becoming detached from the fan and impacting the fan casing. Such a detached fan blade could cause considerable damage to the aircraft powered by the engine if it were not contained by the fan casing. Similar damage could also result if the fan blade suffered failure through fatigue.

One way of ensuring that the fan casing contains such a detached fan blade is to manufacture the casing from a strong thick material such as steel. This unfortunately adds a large amount of undesirable weight to the engine. Alternatively the fan casing can be made from a thinner, lighter metal which is surrounded by a strong woven material as is described in GB 2159886B. Aromatic polyamide fibre is described as being suitable in the manufacture of the strong woven material.

The use of a lighter casing which is surrounded by a strong woven material is clearly attractive in view of the weight savings which it brings about. There is, however, still a danger that sharp pieces of detached fan blade could sever the woven fibre. Moreover, a thick layer of woven fibre is needed to provide effective fan blade containment.

SUMMARY OF THE INVENTION

It is an effect of the present invention to provide an improved containment structure in which such drawbacks are substantially overcome.

According to the present invention, a containment structure comprises a wall positioned adjacent means which are to be contained, a layer adjacent said wall on the opposite side thereof to said means to be contained and comprising a plurality of deformable tubular members, and a layer of strong woven fibrous containment material adjacent said layer of deformable tubular members.

BRIEF DESCRIPTION OF THE DRAWINGS

The present invention will now be described, by way of example, with reference to the accompanying drawings in which.

DETAILED DESCRIPTION OF THE INVENTION

Figure 1:
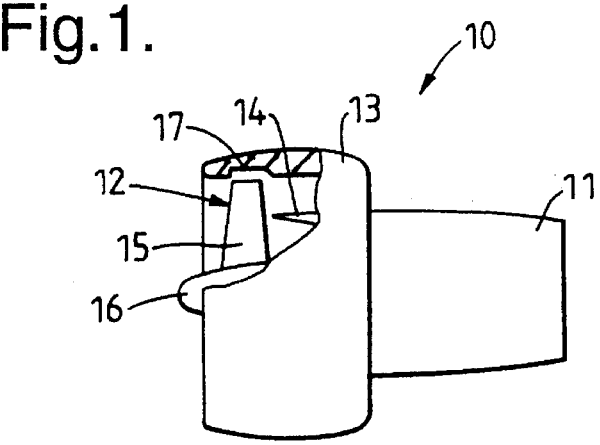
FIG. 1 is a partially sectioned side view of a ducted fan gas turbine engine which includes a containment structure in accordance with the present invention.

With reference to FIG. 1, a ducted fan gas turbine engine generally indicated at 10 is of generally conventional configuration. It consists essentially of a core engine 11 which drives a fan 12 located at the forward end of the engine 10. The fan 12 is surrounded by an annular fan casing 13. Air drawn in by the fan 12 is divided by an annular splitter 14 immediately downstream of the fan. The air which passes over the radially outermost part of the splitter 14 is exhausted from the downstream end of the fan duct 13 to provide propulsive thrust. The air passing over the radially innermost part of the splitter 14 is directed into the core engine 11 to facilitate the operation of that core engine 11.

The fan 12 comprises an annular array of radially extending aerofoil blades 15 which are attached to a common hub 16.

Figure 2:
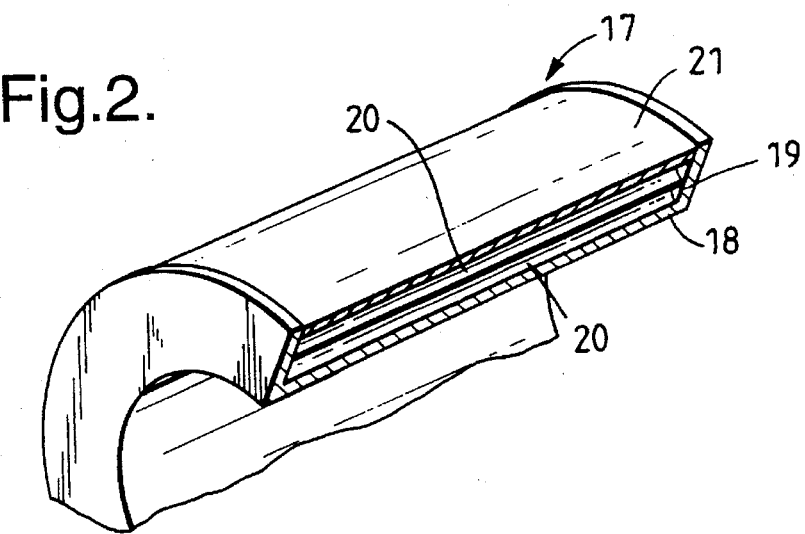
FIG. 2 is a partially sectioned perspective view of the containment structure of the ducted fan gas turbine engine shown in FIG. 1.

That portion of the fan casing 13 which surrounds the radially outer extents of the fan blades 15 is modified as indicated at 17 in order to provide containment of a portion or portions of the fan blades 15 in the event of their failure. The containment portion 17 of the fan casing 13 can be seen more clearly if reference is now made to FIG. 2. Essentially, the containment portion 17 is made up of three coaxial layers of different materials. The first layer 18, which is situated immediately adjacent the radially outer tips of the fan blades 15, is solid so as to be structurally rigid and is formed from a suitable metal such as steel or aluminium. Integral ribs (not shown) may be provided on the radially outer surface of the first layer 18 in order to enhance its rigidity. However, the first layer 18 is not so thick that it would provide containment of large parts of the fan blades 15 should they become detached. Thus it is intended that detached parts of the fan blades 15 should pass through the first layer 18. The first layer 18 therefore provides a certain degree of retardation of detached fan blade 15 parts. It is not so thick, however, as to provide a significant weight penalty for the engine 10.

Figure 3:
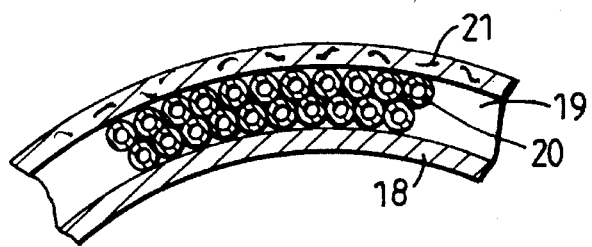
FIG. 3 is a cross-sectional view of a part of the containment structure shown in FIG. 2.

The radially outer surface of the first layer 18 has positioned adjacent to it, a second layer 19. The second layer 19, is made up of a plurality of similar short deformable metal tubes 20 as can also be seen in FIG. 3. It will also be understood however that tubes other than those made of metal may be employed as long as they are suitably deformable. As will be apparent from FIGS. 2 and 3, the tubes are arranged in a group so that their axes are aligned. For instance the tubes 20 could be made from a suitable thermoplastic polymer. The tubes 20 are laid end-to-end so that their axes lie generally parallel to the longitudinal axis of the engine 10, ie the axis about which the fan 12 rotates. As can be seen from the drawings, there is a double thickness of the tubes 20 with one layer of tubes 20 located radially outwardly of the other layer so that radially adjacent tubes 20 are axially staggered with respect to each other. There could, however, be a single thickness of tubes 20 or more than two layers depending upon the circumstances of their use.

The third and final layer 21 is positioned adjacent to the second layer 19. It consists of several thicknesses of high strength woven aramid fibres which are sold under the trade name "Kevlar" (Kevlar is a registered trade mark of Du Pont Company). However the present invention provides that fibres which are stronger and thicker than aramid fibres such as, for instance, carbon fibres could be used if so desired. The woven aramid fibres may be in the form of a single length of cloth which is wrapped around the tube layer 19. Alternatively, a plurality of single sheets of woven cloth may be interposed between a single wound length and the tube layer 19.

In the event that a large fan blade 15 portion or indeed a whole fan blade 15 becomes detached from the fan 12, it will fly in a radially outward direction to impact the first layer 18 of the containment portion 17 of the fan casing 13. As previously stated, the first layer 18 is not sufficiently thick to contain a complete fan blade 15 or a large portion of one. Consequently the detached portion passes through the first layer 18. The layer 18 does, however absorb some of the kinetic energy of the detached blade portion.

The detached blade portion then engages the second layer 19 made up of the short metal tubes 20. As soon as the tubes 20 are contacted by the detached blade portion they buckle or otherwise deform to wrap around the edges of the detached blade portion. This serves two purposes. Firstly in deforming, the tubes absorb more kinetic energy from the detached blade portion. In this respect the tubes 20 could be sealed in which case even more kinetic energy would be absorbed in deforming them. Secondly, the possibly sharp edges of the detached blade portion, since they are shielded by deformed tubes wrapped around them, are less likely to sever the woven cloth in the third layer 21.

The third layer 21, made up of woven aramid fibre, serves to provide the final containment of the detached fan blade 15 portion.

The deformed tubes 20, as well as reducing the likelihood of the third layer 21 being severed, serve an additional purpose. Thus by collapsing progressively they effectively decrease the stiffness of the third woven fibre layer 21 from the standpoint of the detached fan blade 15 portion to thereby cushion the blow of the portion. This in turn means that less woven fibre need be employed in the third layer 21 than would otherwise be the case. Moreover, the collapsing of the tubes 20 allows the woven fibre layer 21 to move locally in a tangential direction. This permits an extension of the arc of woven fibre which is actively involved in containment to the larger than would otherwise be the case. Consequently the effectiveness of containment is improved still further.

Although the present invention has been described with reference to the containment of fan blades or fan blade portions, it will be appreciated that it also could be applied to other parts of a gas turbine engine in order to provide effective containment of detached parts. Indeed the present invention is not specifically limited to use in gas turbine engines.

I claim:

1. A containment structure comprising a wall positioned adjacent means which are to be contained, a layer adjacent said wall on the opposite side thereof to said means to be contained and comprising a plurality of deformable tubular members and a layer of strong woven fibrous containment material adjacent said layer of deformable tubular members, said containment structure constituting a part of a fan casing of a ducted fan gas turbine engine.

2. A containment structure as claimed in claim 1 wherein said containment structure comprises an annular cross-section casing.

3. A containment structure as claimed in claim 1 wherein said strong woven fibrous containment material is woven from aramid fibres.

4. A contaminant structure as claimed in claim 1 wherein said tubular members are metallic.

5. A containment structure comprising a wall positioned adjacent means which are to be contained, a layer adjacent said wall on the opposite side thereof to said means to be contained and comprising a plurality of deformable tubular members and a layer of strong, woven fibrous containment material adjacent said layer of deformable tubular members, said containment structure comprising an annular cross-section casing having a longitudinal axis, said tubular members being aligned so that their longitudinal axes are generally parallel with said longitudinal axis of said annular cross-section casing, said tubular members being arranged in groups so that their axes are aligned.

\* \* \* \* \*